(12) United States Patent  
Nagarajan et al.

(10) Patent No.: US 9,185,017 B1  
(45) Date of Patent: *Nov. 10, 2015

(54) ADAPTIVE VIDEO STREAM TESTING

(71) Applicant: Google Inc., Mountain View, CA (US)

(72) Inventors: Guru Nagarajan, San Jose, CA (US); Andrew Flynn, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/298,404

(22) Filed: Jun. 6, 2014

Related U.S. Application Data

(63) Continuation of application No. 13/439,695, filed on Apr. 4, 2012, now Pat. No. 8,782,727.

(51) Int. Cl.
| | |
|---|---|
| *H04N 7/173* | (2011.01) |
| *H04L 12/26* | (2006.01) |
| *H04L 29/06* | (2006.01) |
| *H04N 21/435* | (2011.01) |
| *H04N 21/426* | (2011.01) |

(52) U.S. Cl.
CPC .......... *H04L 43/0888* (2013.01); *H04L 65/601* (2013.01); *H04N 21/42623* (2013.01); *H04N 21/4353* (2013.01)

(58) Field of Classification Search
CPC .................. H04N 21/42615; H04N 21/42623; H04N 21/4353
USPC .................................................. 725/115–120
See application file for complete search history.

(56) References Cited

U.S. PATENT DOCUMENTS

| | | |
|---|---|---|
| 5,694,334 A | 12/1997 | Donahue et al. |
| 6,526,523 B1 | 2/2003 | Chen et al. |
| 7,912,349 B1 | 3/2011 | Bushell et al. |
| 7,934,239 B1 * | 4/2011 | Dagman ..................... 725/86 |
| 8,131,646 B2 | 3/2012 | Kocher et al. |
| 8,548,946 B2 | 10/2013 | Hughes |
| 2002/0006204 A1 | 1/2002 | England et al. |
| 2004/0153561 A1 | 8/2004 | Dalal et al. |
| 2006/0152585 A1 | 7/2006 | Bourret et al. |
| 2006/0179154 A1 | 8/2006 | Sitaraman et al. |
| 2007/0162487 A1 | 7/2007 | Frailey |
| 2008/0059848 A1 * | 3/2008 | Pei et al. ..................... 714/712 |
| 2008/0137848 A1 * | 6/2008 | Kocher et al. ............... 380/201 |
| 2008/0231711 A1 | 9/2008 | Glen et al. |

(Continued)

OTHER PUBLICATIONS

Notice of Allowance for U.S. Appl. No. 13/439,695, dated Mar. 6, 2014, 19 pages.

*Primary Examiner* — Pankaj Kumar  
*Assistant Examiner* — Sahar Baig  
(74) *Attorney, Agent, or Firm* — Amin, Turocy & Watson, LLP

(57) ABSTRACT

Systems and techniques for implementing adaptive video stream testing are presented. In particular, installation of a digital rights management (DRM) client is validated. Furthermore, a decrypted video stream at a particular bitrate is received in response to validating a DRM client. Data throttling is implemented to simulate one or more network speeds for the decrypted video stream. Additionally, video playback time is measured for a codec at the one or more network speeds and it is determined whether the video playback time for the codec exceeds a predetermined threshold value. A test report is generated that lists the codec and the video playback time for the codec at the one or more network speeds.

20 Claims, 13 Drawing Sheets

(56) References Cited

U.S. PATENT DOCUMENTS

| | | |
|---|---|---|
| 2009/0089445 A1 | 4/2009 | Deshpande |
| 2009/0157876 A1 | 6/2009 | Lection |
| 2009/0208140 A1 | 8/2009 | Jayant et al. |
| 2011/0263243 A1 | 10/2011 | Topaltzas et al. |
| 2012/0203891 A1 * | 8/2012 | Jiang et al. .................... 709/224 |

* cited by examiner

| BUILD INFORMATION | | TEST SUMMARY | |
|---|---|---|---|
| BUILD MODEL | A654 | VIDEO TEST VERSION | 1.0 |
| BUILD ID | (ID) | | |
| BUILD BRAND | (BRAND) | TESTS PASSED | 24 |
| DEVICE | (DEVICE) | TEST FAILED | 2 |
| BUILD FINGERPRINT | (BRAND)/(PRODUCT)/(DEVICE)/ (BOARD):(VERSION.RELEASE)/(ID)/ (VERSION.INCREMENTAL):(TYPE)/ (TAGS) | TEST NOT EXECUTED | 7 |
| VERSION | 1.2.4 | | |

| TEST | RESULT | DETAILS |
|---|---|---|
| CODEC A | PASS | [OPEN] |
| CODEC B | PASS | [OPEN] |
| ⋮ | ⋮ | ⋮ |
| CODEC N | FAIL | [OPEN] |

FIG. 8

ADAPTIVE VIDEO STREAM TESTING

CROSS-REFERENCE TO RELATED APPLICATION

This application is a continuation of U.S. patent application Ser. No. 13/439,695, filed Apr. 4, 2012 and entitled, "ADAPTIVE VIDEO STREAM TESTING," the entirety of which is incorporated herein by reference.

TECHNICAL FIELD

This disclosure relates generally to testing streaming video content on a device, and more specifically, to adaptive video stream testing for a device.

BACKGROUND

The amount of media content (e.g., video content) available on mobile devices is growing. However, a network often cannot provide constant bandwidth to a mobile device to play the media content over the network. As network speed and/or available bandwidth from a network varies, the quality of video content received on a mobile device can be reduced. One solution is to implement adaptive bitrate (ABR) streaming which can be implemented to deliver different quality media content to a mobile device based on available bandwidth (e.g., the quality of video provided to a mobile device can be varied based on the available bandwidth of a network). For example, a lower bitrate and lower video quality can be presented to a mobile device when network bandwidth drops. Similarly, a higher bitrate and higher video quality can be presented to a mobile device for higher available network bandwidth.

However, testing ABR streaming on mobile devices brings various challenges. For example, different mobile devices can include multiple hardware configurations and/or multiple software customizations. As such, differences in hardware and/or software implementations in mobile devices can cause incompatibilities in video services provided to mobile devices. Furthermore, mobile devices are often required to meet guidelines to ensure adequate video quality for mobile device users. However, conventional methods of testing video quality for different mobile devices are inefficient and/or are often difficult to successfully implement.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a validation component, a media component, a simulation component, and a test component. The validation component validates installation of a digital rights management (DRM) client. The media component receives a decrypted video stream at a particular bitrate in response to validating a DRM client. The simulation component implements data throttling to simulate one or more network speeds for the decrypted video stream. The test component measures video playback time for a codec at the one or more network speeds and determines whether the video playback time for the codec exceeds a predetermined threshold value. In one implementation, the system further includes a report component that generates a test report. The test report lists the codec and the video playback time for the codec at the one or more network speeds. In yet another implementation, the system further includes an output component that uploads the test report to a server.

Additionally, a non-limiting implementation provides for validating installation of a digital rights management (DRM) client, receiving a decrypted video stream at a particular bitrate in response to validating a DRM client, varying the particular bitrate via data throttling, executing one or more tests using the decrypted video stream at one or more supported resolutions for a codec, and generating a test report that lists the codec and test results for the codec.

Furthermore, a non-limiting implementation provides for validating installation of a digital rights management (DRM) client, receiving a decrypted video stream at a particular bitrate in response to validating a DRM client, simulating one or more network speeds for the decrypted video stream via data throttling, measuring video playback time for a supported codec on a device at the one or more network speeds, and determining whether the video playback time for the supported codec exceeds a predetermined threshold value. In one example, the non-limiting implementation can further provide for generating a test report that lists the supported codec and the video playback time for the supported codec at the one or more network speeds.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which:

FIG. 8 depicts an example test report generated by an adaptive video test component, in accordance with various aspects and implementations described herein;

DETAILED DESCRIPTION

Figure 1:
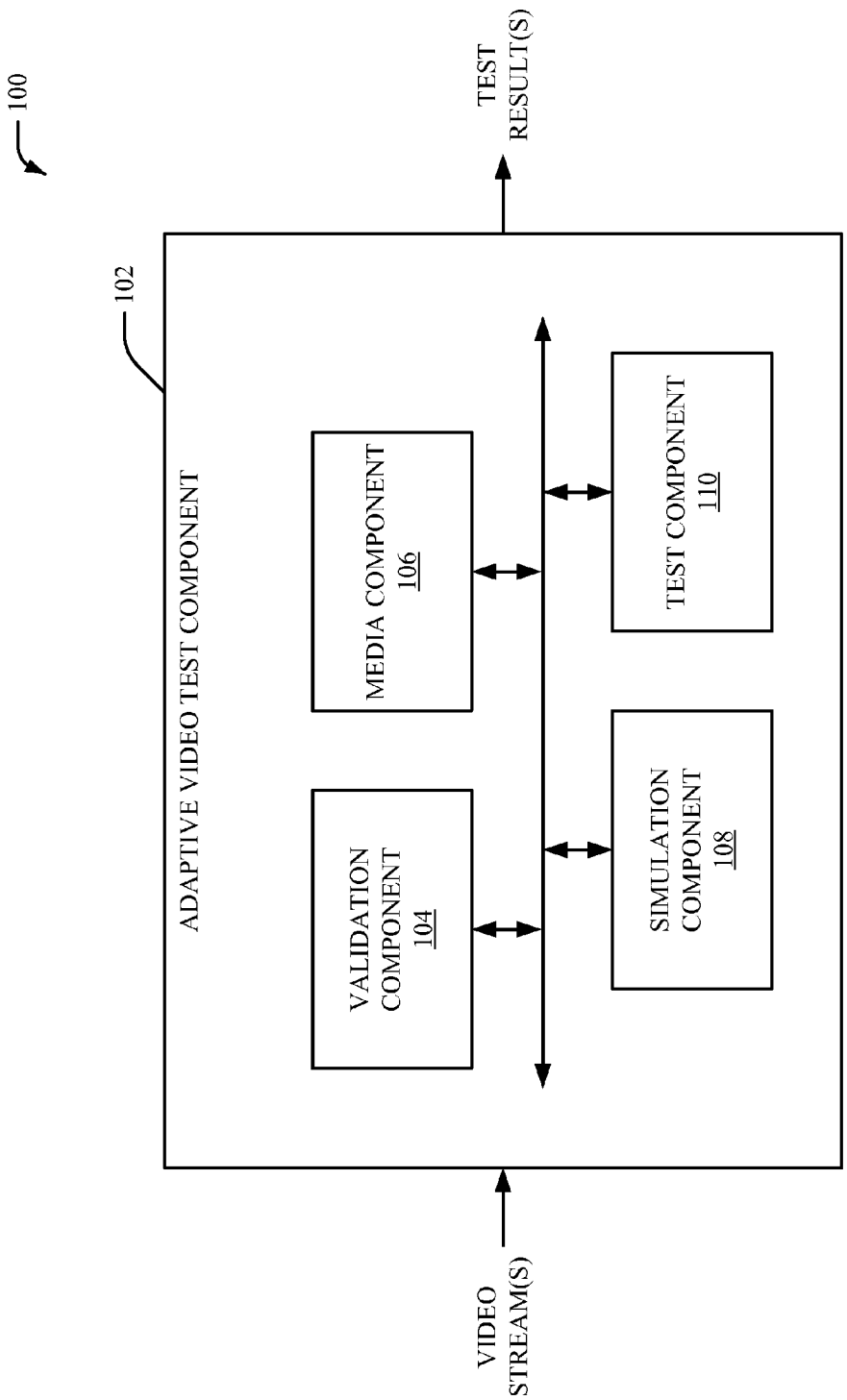
FIG. 1 illustrates a high-level block diagram of an example adaptive video test component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The amount of streaming video content (e.g., streaming media content) available on devices (e.g., mobile devices, media player devices, etc.) is growing. However, a network often cannot provide a constant bandwidth to a device to play the streaming video content over the network. As network speed and/or available network bandwidth varies, the quality of streaming video content received on a device can be reduced (e.g., negatively effected).

One solution is to implement adaptive bitrate (ABR) streaming which can be implemented to deliver streaming video content at different quality levels based on the available bandwidth of a network. For example, a lower bitrate and/or lower video quality can be presented to a device when network bandwidth drops. Similarly, a higher bitrate and/or higher video quality can be presented to a device for higher available network bandwidth.

However, testing ABR streaming on devices brings various challenges. For example, different devices can include multiple hardware configurations (e.g., display capabilities) and/or multiple software customizations. As such, differences in hardware and/or software on different devices can cause incompatibilities for video playback (e.g., playback of streaming video content from a video service provider).

Furthermore, devices are required to meet guidelines to ensure sufficient video quality for display on the device. As such, a list of videos and/or test descriptions can be provided for manual testing of a device. However, it is difficult and/or inefficient to manually test the capability of device hardware to playback different types of streaming video content (e.g., streaming video content at different resolutions and/or streaming video content at different bitrates) for different devices. Additionally, it is difficult and/or inefficient to manually test the ability of different devices to adapt video playback to varying network speeds (e.g., varying bitrates).

To that end, techniques for implementing adaptive video stream testing are presented. For example, a series of tests can be implemented to test compatibility and/or performance of a device-under-test (DUT) from a hardware perspective and/or based on software customization of the DUT. Systems and methods disclosed herein relate to implementing adaptive video stream testing using circuitry and/or instructions stored or transmitted in a computer readable medium in order to test quality of video playback on the DUT under various network conditions. For example, various network speeds can be simulated on the DUT via data throttling. Playback of various video source resolutions and/or video source bitrates for supported codecs on the DUT can be tested. Therefore, video playback time, device performance, video output for various types of network connections and/or underlying device hardware on the DUT can be tested. As such, improved video playability for devices can be achieved.

Referring initially to FIG. 1, there is illustrated an example system 100 that implements adaptive video stream testing, according to an aspect of the subject disclosure. For example, the system 100 can implement adaptive video stream testing for a device-under-test (DUT). Specifically, the system 100 can provide a component with a validation feature (e.g., validation component 104), a media feature (e.g., media component 106), a simulation feature (e.g., simulation component 108) and a test feature (e.g., test component 110) that can be utilized in most any video stream testing application. The validation feature can validate installation of one or more libraries and/or a digital rights management (DRM) client. The media feature can receive a decrypted video stream at a particular bitrate in response to validating a DRM client. The simulation feature can implement data throttling to simulate one or more network speeds. The test feature can measure video playback time for a codec (e.g., one or more supported codecs) at the one or more network speeds. The test feature can also determine whether the video playback time for the codec (e.g., the one or more supported codecs) exceeds a predetermined threshold value. The report feature can generate a test report. The system 100 can be employed by various systems, such as, but not limited to, mobile phones (e.g., smart phones), tablets, image and video capturing systems, media player systems, televisions, personal data assistants, gaming systems, computing devices, and the like.

In particular, the system 100 can include a component 102. In one example, the component 102 can be implemented as an adaptive video test component. In FIG. 1, the component 102 includes a validation component 104, a media component 106, a simulation component 108 and a test component 110. The component 102 can receive one or more video streams (e.g., VIDEO STREAM(S) shown in FIG. 1). The one or more video streams can be one or more decrypted video streams.

The validation component 104 can validate (or be configured to validate) installation of one or more libraries. For example, the validation component 104 can validate installation of one or more application libraries (e.g., software libraries) on a DUT. The one or more libraries can correspond to the adaptive video test component 102, one or more codecs installed on the DUT, an operating system installed on the DUT and/or other libraries installed on the DUT. Additionally, the validation component 104 can validate (or be configured to validate) installation of a DRM client (e.g., a correct DRM client for protected video content). For example, the validation component 104 can validate installation of a DRM client (e.g., a DRM plugin) on the DUT. Furthermore, the validation component 104 can validate usage of video content and/or the DRM client. As such, the validation component 104 can acquire usage rights (e.g., rights to use video content) and/or relinquish usage rights of video content and/or the DRM client. The validation component 104 can also validate rights for playing protected video for adaptive bitrate (ABR) and/or or non-ABR content. Additionally, the validation component 104 can validate rights for streaming video content and/or offline video content.

The media component 106 can receive (or be configured to receive) a decrypted video stream at a particular bitrate (e.g., one or more decrypted video streams at one or more bitrates and/or one or more resolutions) in response to a valid DRM client. The one or more decrypted video streams can be a preconfigured list of videos for testing. For example, the media component 106 can generate a request for protected video content (e.g., encrypted video content, DRM video content, etc.). In response to a successful request, the DRM client can decrypt the protected video content and generate one or more decrypted video streams. Accordingly, the media component 106 can receive the one or more decrypted video streams at one or more bitrates and/or one or more resolutions (e.g., 360p, 480p, 720p, 1080p, etc.) in response to a valid DRM client. The one or more encrypted video streams can be received from an external device (e.g., a remote video content server).

The simulation component 108 can implement (or be configured to implement) data throttling to simulate one or more network speeds (e.g., one or more bitrates, one or more network bandwidths) for the decrypted video stream (e.g., the one or more decrypted video streams). For example, the simulation component 108 can be implemented to simulate one or more network speeds to test the quality of video playback on the DUT for different network conditions. The simulation component 108 can modify one or more threshold values to simulate the one or more network speeds. As such, the DUT can be forced to request a video stream for a different network condition (e.g., a lower bandwidth). As a result, the remote video content server can deliver the one or more encrypted video streams at a lower bitrate. For example, the one or more threshold values can include a threshold value for a first network type (e.g., a low bandwidth network), a threshold value for a second network type (e.g., high bandwidth network) and/or a threshold value for a third network type (e.g., a non-streaming network). For example, a low bandwidth network can be a third generation (3G) network. A high bandwidth network can be a Long Term Evolution (LTE) network, a fourth generation (4G) network or a wireless local area network (WLAN). The non-streaming network can be downloaded video content. However, it is to be appreciated that the number of threshold values can be varied to meet the design criteria of a particular implementation. The simulation component 108 can modify a kernel counter to receive one or more encrypted video streams (e.g., from the video content server) at a particular speed.

The test component 110 can determine the number of codecs installed on the DUT (e.g., test for the presence of one or more codecs on the DUT) and/or the supported resolutions for one or more codecs installed on the DUT. The test component 110 can measure (or be configured to measure) video playback time for the one or more codecs at the one or more network speeds. The test component 110 can also determine (or be configured to determine) whether the video playback time for the one or more codecs exceeds a predetermined threshold value (e.g., a maximum buffering time for video playback).

The test component 110 can implement one or more stress tests that verify playback functionality of the decrypted video stream (e.g., the one or more decrypted video streams). For example, the one or more stress tests can verify play functionality, pause functionality and/or playback functionality of the one or more decrypted video streams. In one example, DRM video content (e.g., the one or more decrypted video streams) can be played, the DRM video content can be paused (e.g., by turning off the display of the DUT), and playback can be verified from the paused location (e.g., resuming video playback from the paused location can be verified). In another example, the one or more stress tests can include switching between the one or more decrypted video streams and another video source. For example, decrypted video stream playback can be switched to video content from an internet video content provider and/or video content from a camera on the DUT. As such, the test component 110 can test switching between streaming video content (e.g., video content received over a network) and non-streaming video content (e.g., video content not received over a network). The test component 110 can also check for errors in the video playback. Therefore, the test component 110 can determine if video playback is adequate for various network connections. Furthermore, the test component 110 can test playback of offline video content. For example, one or more videos decrypted by the DRM client can be copied (e.g., stored) on the DUT. Therefore, one or more offline video streams can be played back from the DUT and/or playability of the one or more offline video streams can be tested.

The number of tests generated by the test component 110 can be determined based at least in part by the one or more codecs installed on the DUT. Each supported resolution and/or supported bitrate for each codec on the DUT can be testsed. The video playback time for the one or more codecs on the DUT, results from one or more stress tests and/or other test results (e.g., TEST RESULT(S) shown in FIG. 1) can be uploaded to a server (e.g., a backend server).

While FIG. 1 depicts separate components in system 100, it is to be appreciated that the components may be implemented in a common component. In one example, the validation component 104, the media component 106, the simulation component 108 and/or the test component 110 can be included in a single component. Further, it can be appreciated that the design of system 100 can include other component selections, component placements, etc., to implement adaptive video stream testing.

Figure 2:
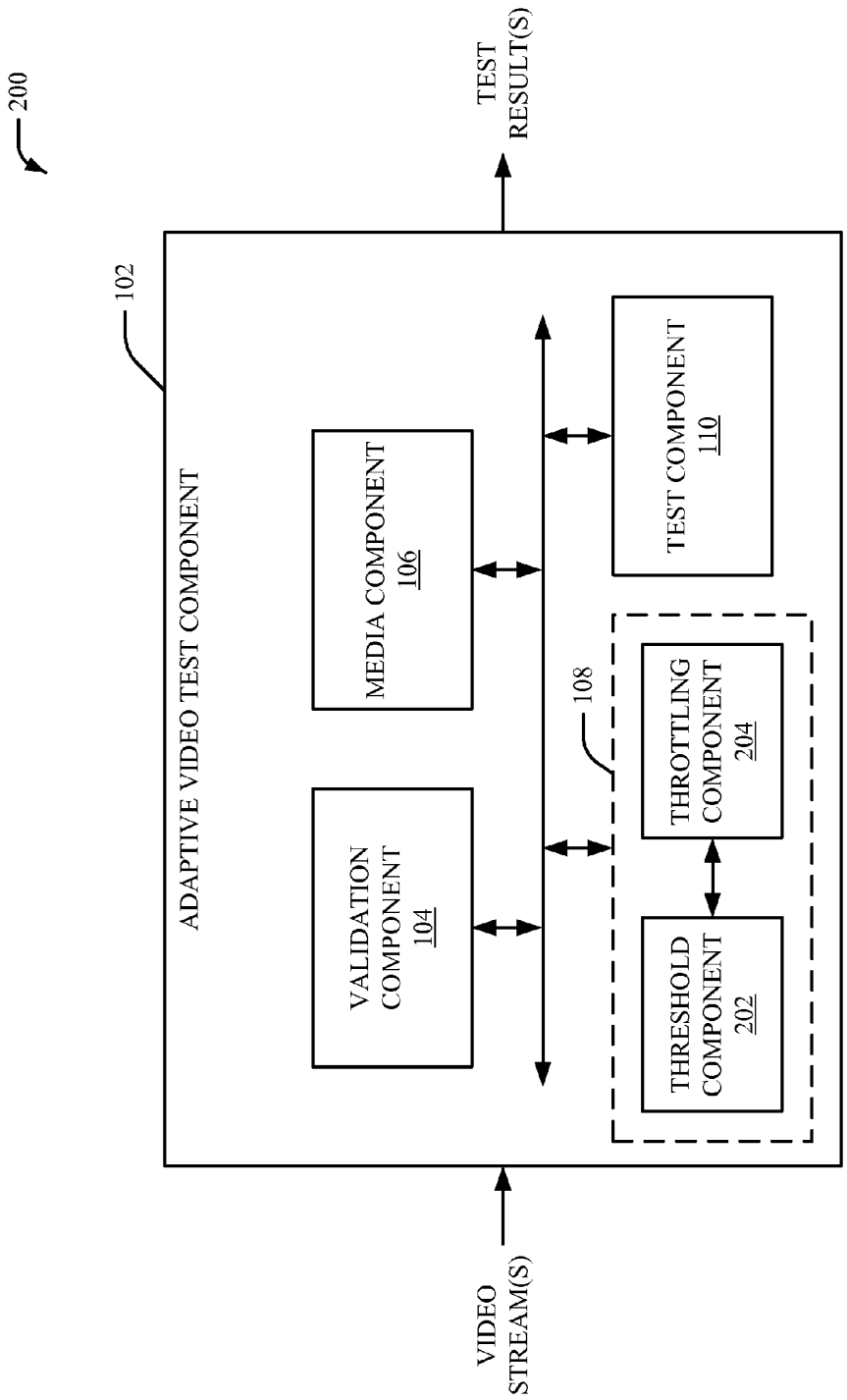
FIG. 2 illustrates a high-level block diagram of a threshold component and a throttling component in an example adaptive video test component, in accordance with various aspects and implementations described herein.

Referring now to FIG. 2, there is illustrated a non-limiting implementation of a system 200 in accordance with various aspects and implementations of this disclosure. The system 200 includes the component 102. The component 102 includes the validation component 104, the media component 106, the simulation component 108 and the test component 110. The simulation component 108 includes a threshold component 202 and a throttling component 204.

The threshold component 202 can generate and/or store one or more threshold values. The one or more threshold values can correspond to one or more different network types (e.g., different network speeds). Each of the one or more threshold values can include a different bitrate for video content. For example, a first threshold value can correspond to a network speed for a 3G network. As such, video content at a certain resolution (e.g., 360p resolution) and at a certain bitrate (e.g., 600 Kbps) can be delivered to the DUT. A second threshold value can correspond to a network speed for an LTE network, 4G network or a WLAN. As such, video content at a certain resolution (e.g., 720p resolution) and at an alternating bitrate (e.g., 1 Mbps to 4 Mbps) can be delivered to the DUT. In response to a predetermined level of buffering, video content at a lower resolution (e.g., 360p resolution) can be delivered to the DUT. Also, a third threshold value can correspond to a network speed for downloaded video content (e.g., non-streaming video content, content with no ABR streaming, etc.). As such, video content at a certain resolution (e.g., 720p resolution) and a certain bitrate (e.g., 4 Mbps) can be delivered to the DUT. However, it is to be appreciated that the number of threshold values and/or the bitrate values of the thresholds can be varied to meet the design criteria of a particular implementation. In one example, four predefined levels (e.g., four threshold values) with four different bitrates can be implemented. For example, a first predefined level can correspond to a 3G network at 600 Kbps, a second predefined level can correspond to an LTE network at 1 Mbps, a third predefined level can correspond to a 4G network at 2 Mbps and a fourth predefined level can correspond to a WLAN at 4 Mbps.

The throttling component 204 can enable data throttling on the DUT (e.g., the throttling component 204 can enable a throttling mode on the DUT). The throttling component 204 can simulate one or more network speeds via data throttling. One or more data throttling conditions can be used to simulate the DUT. The throttling component 204 can modify a threshold value (e.g., switch between the one or more threshold values) to simulate different network speeds. Therefore, the one or more threshold values can be modified during runtime. The throttling component 204 can modify a byte count to activate data throttling. For example, the throttling component 204 can modify a kernel counter to receive data at a specified speed. In one example, the kernel counter can be generated by the kernel level of an operating system installed on the DUT. In another example, the kernel counter (e.g., a network counter) can be generated by a network driver. For example, a WLAN driver can interact with the operating system installed on the DUT to allow the DUT to throttle bandwidth of a network connection. As such, a server (e.g., a video content provider) can be forced to lower network bandwidth for streaming video content.

Figure 3:
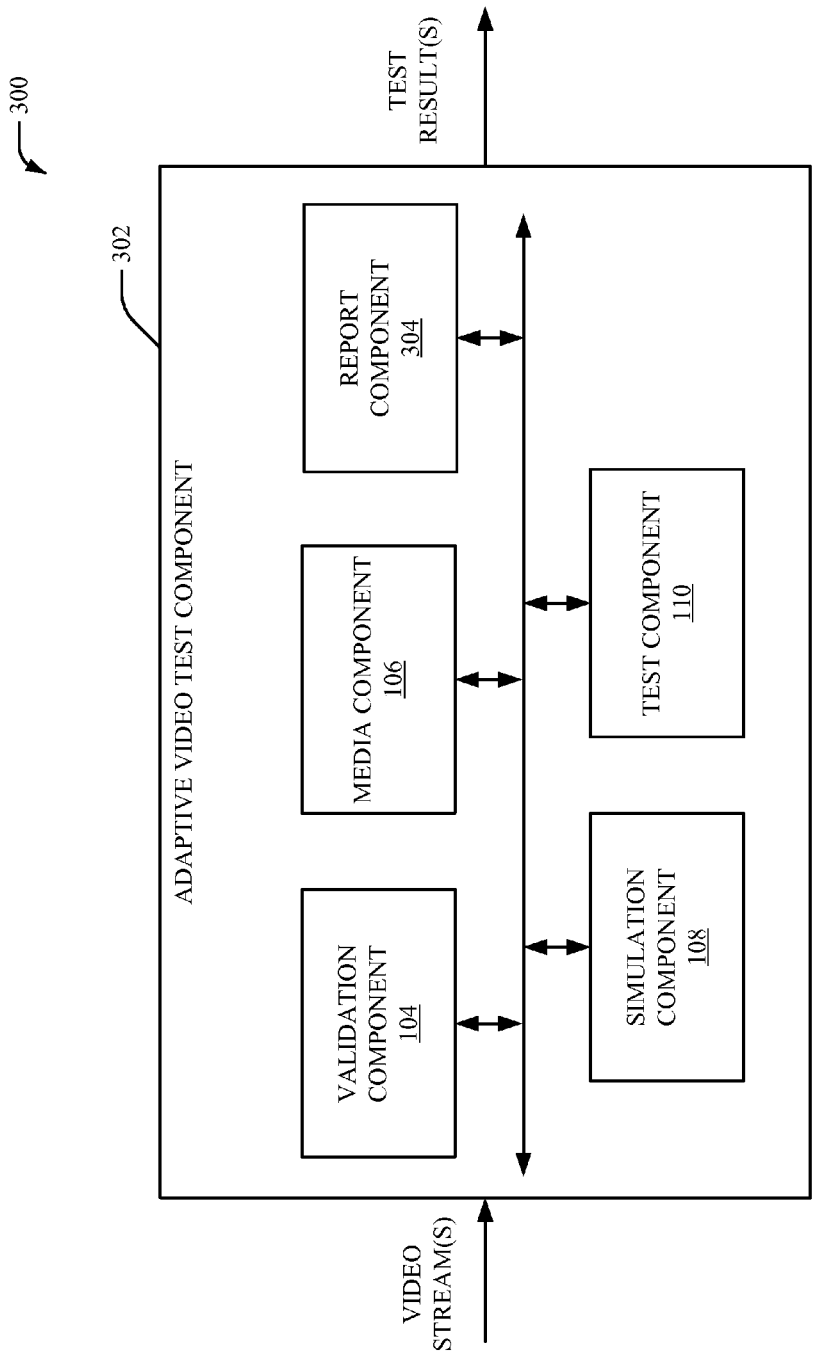
FIG. 3 illustrates a high-level block diagram of report component in an example adaptive video test component, in accordance with various aspects and implementations described herein.

Referring now to FIG. 3, there is illustrated a non-limiting implementation of a system 300 in accordance with various aspects and implementations of this disclosure. The system 300 includes a component 302. The component 302 includes the validation component 104, the media component 106, the simulation component 108, the test component 110 and a report component 304.

The report component 304 can generate (or be configured to generate) a test report. The test report can include a list of one or more codecs (e.g., supported codecs on the DUT). Furthermore, the test report can provide pass/fail data for the one or more codecs. For example, a test can be considered passed if underlying codec(s) required for video playback are present on the DUT. The test report can also include video playback time for the one or more codecs at the one or more network speeds (e.g., network bandwidths). For example, the test report can include whether buffering of video content for each test exceeded a particular threshold value (e.g., a maximum buffering time). As such, a test can also be considered passed if playback time of videos for a codec are within a specified limit. Therefore, it can be determined via the test report whether a device (e.g. a DUT) meets quality criteria for video playback. Additionally, the test report can include, for example, a device name, a device model, a product name, a build fingerprint, test results by test case name, etc. As such, the test report can provide information about the DUT (e.g., the tested device). The test report is described in more detail in connection with FIG. 8.

Figure 4:
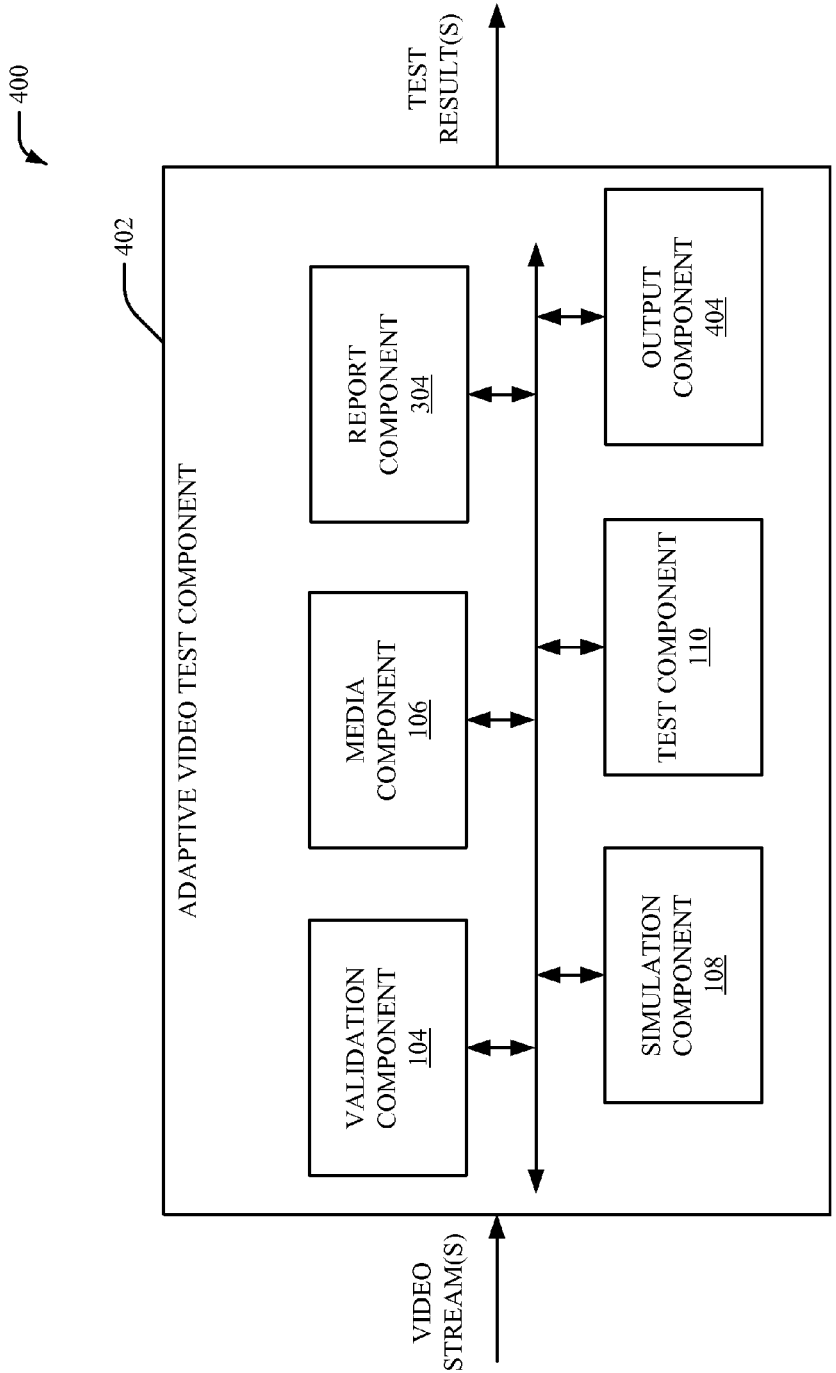
FIG. 4 illustrates a high-level block diagram of an output component in an example adaptive video test component, in accordance with various aspects and implementations described herein.

Referring now to FIG. 4, there is illustrated a non-limiting implementation of a system 400 in accordance with various aspects and implementations of this disclosure. The system 400 includes a component 402. The component 402 includes the validation component 104, the media component 106, the simulation component 108, the test component 110, the report component 304 and an output component 404.

The output component 404 can upload the test report to a remote server (e.g., a backend server). The test report uploaded by the output component 404 can be, for example, an extensible markup language (XML) file or another machine readable language. Furthermore, the test report uploaded by the output component 404 can be reviewed on the remote server. Therefore, test results for one or more supported codecs on a device (e.g., the DUT) can be reviewed and/or device compatibility can be determined. As such, the DUT corresponding to the test report can be approved or rejected based on the test report uploaded by the output component 404.

Figure 5:
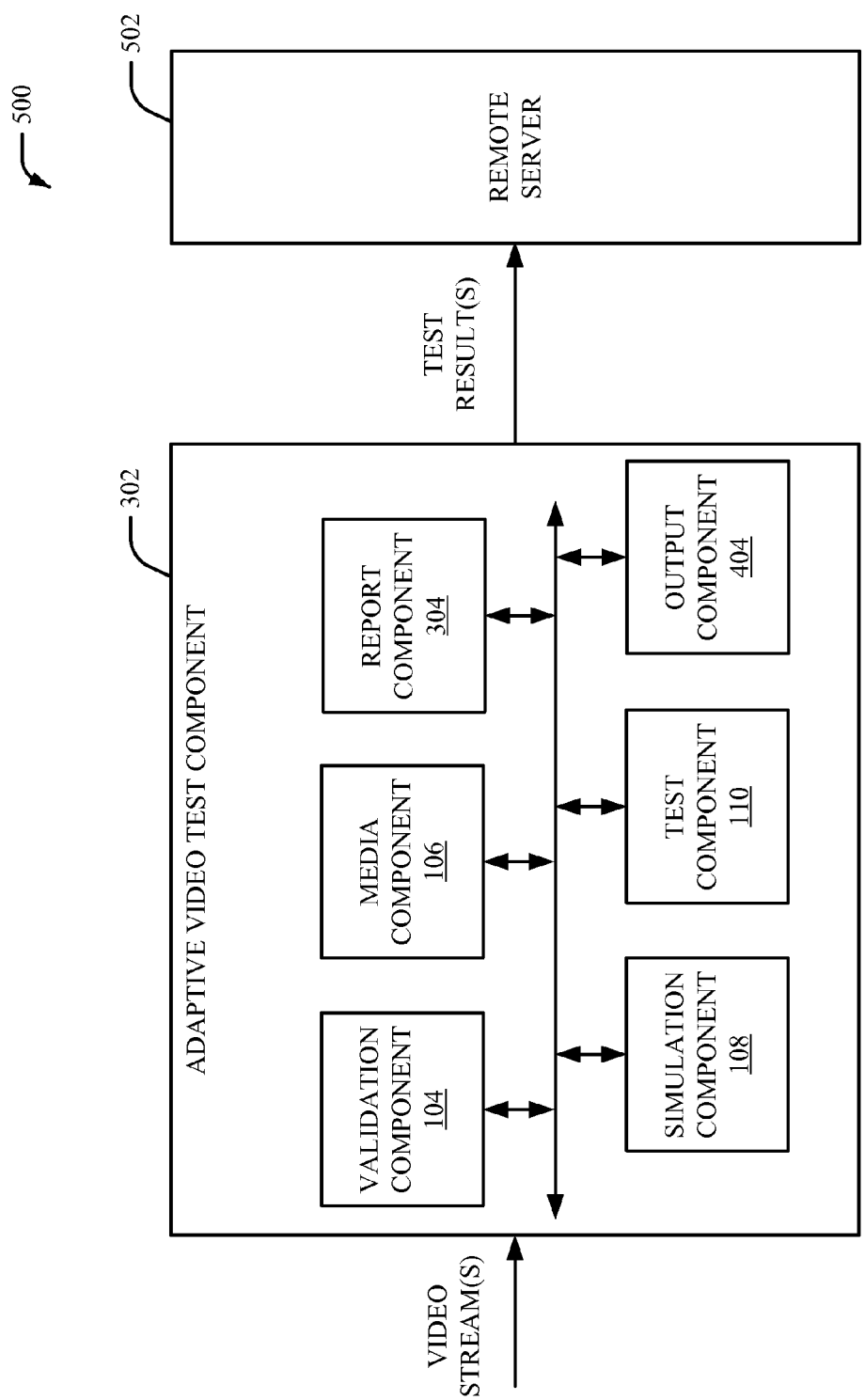
FIG. 5 illustrates a block diagram of an example adaptive video test system, in accordance with various aspects and implementations described herein.

Referring now to FIG. 5, there is illustrated a non-limiting implementation of a system 500 in accordance with various aspects and implementations of this disclosure. The system 500 includes the component 302 and a server (e.g., a remote server) 502. The component 302 includes the validation component 104, the media component 106, the simulation component 108, the test component 110, the report component 304 and the output component 404.

The server 502 can be implemented as a backend server. The server 502 can store one or more test reports (e.g., one or more test reports uploaded by the output component 404). The server 502 can also be implemented to manage the test process. For example, the stored reports can be examined via the server 502 for device incompatibilities. The server 502 can associate the one or more stored test reports (e.g., one or more test reports uploaded by the output component 404), for example, with an original equipment manager (OEM), a device, a product and/or a build. The test reports can be viewed and/or searched via the server 502. As such, a DUT can be approved or rejected based on the test reports uploaded to the server 502. It is to be appreciated that the server 502 can store and/or manage one or more test reports from more than one DUT (e.g., data from multiple tested devices can be stored on the server 502).

Figure 6:
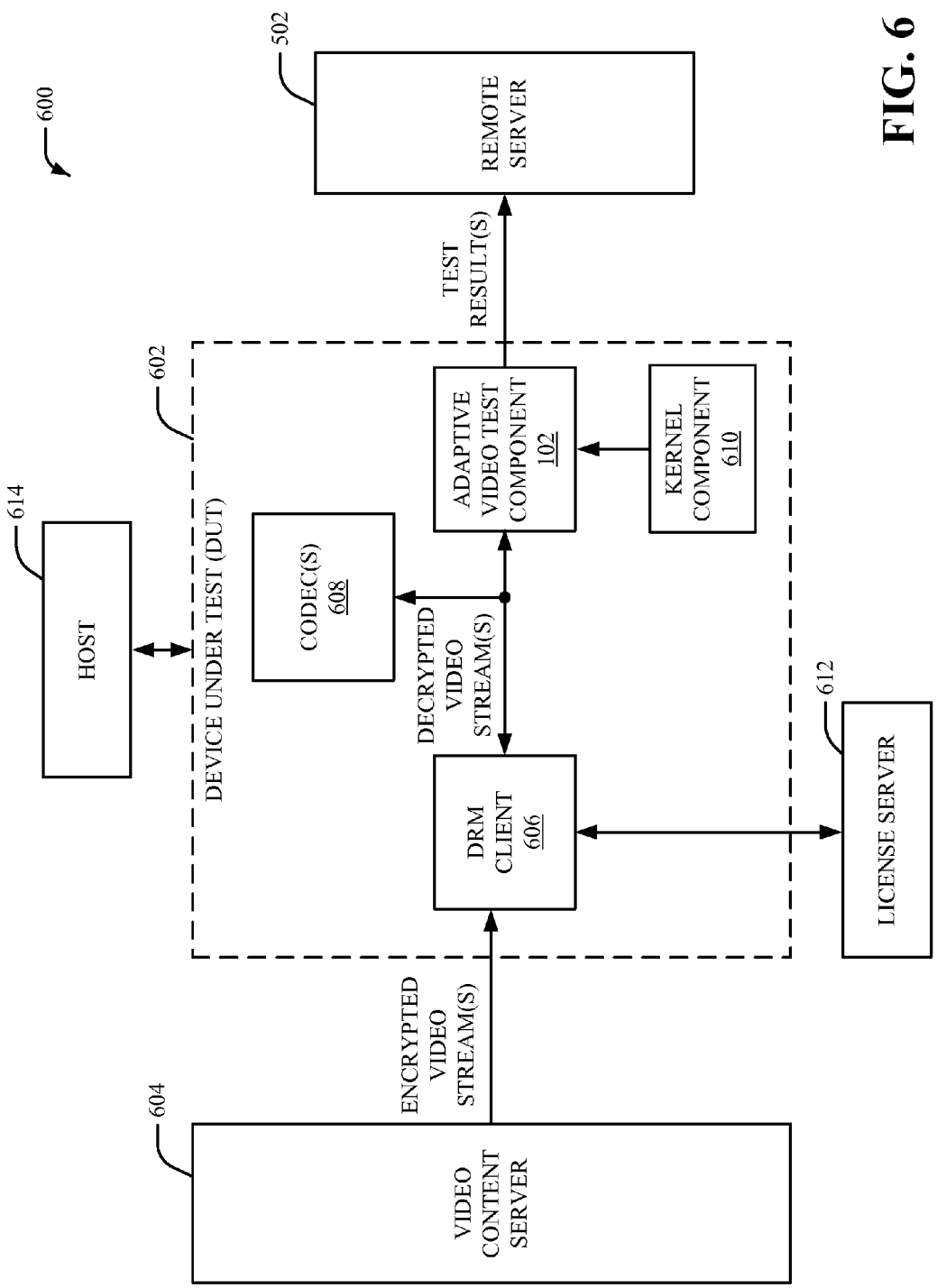
FIG. 6 illustrates a block diagram of a device-under-test (DUT) in an example adaptive video test system, in accordance with various aspects and implementations described herein.

Referring now to FIG. 6, there is illustrated a non-limiting implementation of a system 600 in accordance with various aspects and implementations of this disclosure. The system 600 includes a device under test (DUT) 602, a video content server 604 and the server 502. The DUT 602 can include the component 102 (e.g., or the component 302 or the component 402), a DRM client 606, one or more codecs 608 and a kernel component 610.

The DUT 602 can be implemented as a mobile phone (e.g., a smart phone), a tablet, an image and video capturing system, a media player system, a television, a personal data assistant, a gaming system, a computing device, or the like. The DUT 602 can display (or be configured to display) video content (e.g., by outputting video content generated by the one or more codecs 608 to a display on the DUT).

The DRM client 606 can be implemented as a DRM plugin. A DRM framework can associate protected content (e.g., one or more encrypted video streams, one or more protected video streams, etc.) with the DRM client 606. The DRM client 606 can be registered with the DRM framework. Furthermore, the DRM client 606 can implement hardware-backed protection and/or software-backed protection to secure video content and/or user credentials. The DRM client 606 can provide video content protection and/or rights management for the DUT 602. For example, the DRM client 606 can assemble license requests, handle responses, check video content usage against constraints in the license, manage output controls according to the license and/or decrypt the protected video content.

The DRM client 606 can request a user license for the protected video content (e.g., ENCRYPTED VIDEO STREAM(S) shown in FIG. 6). The DRM client 606 can send a license request to a license server 612. For example, the license server 612 can be implemented as a video content license server. In one example, the license server 612 can be implemented as more than one license server (e.g., a license server for a first entity and a license server for a second entity). The DRM client 606 can also send device information (e.g., information regarding the DUT 602) to the license server 612. The device information can include, for example, a content identifier, device make, device model, design name (e.g., device name) and/or session information. In response to a successful request to the license server 612, the license server 612 can present an encrypted license and/or keys to the DRM client 606. The DRM client 606 can decrypt the protected video content (e.g., the one or more encrypted video streams, the one or more protected video streams, etc.) based at least in part on the encrypted license and/or the keys.

After decrypting the protected content, the DRM client 606 can route the decrypted video content (e.g., DECRYPTED VIDEO STREAM(S) shown in FIG. 6) to the component 102 and/or the one or more codecs 608. The one or more codecs 608 can be implemented, for example, within a media player service. The one or more codecs 608 can display and/or playback the one or more decrypted video streams according to output controls supplied by the encrypted license. Each of the one or more codecs 608 can be configured to encode a single video source at multiple bitrates. The component 102 can implement one or more tests (e.g., via data throttling) for the one or more decrypted video streams, as more fully disclosed herein. The kernel component 610 can generate a kernel counter. For example, the kernel component 610 can be implemented as a kernel level of an operating system installed on the DUT. The kernel counter generated by the kernel component 610 can be presented to the component 102 (e.g., the simulation component 108). As such, the kernel counter generated by the kernel component 610 can be modified to receive the protected video content (e.g., the one or more encrypted video streams) at a particular speed.

In one implementation, the adaptive video test component 102 (e.g., or the component 302 or the component 402) can be controlled by a remote host 614. For example, the remote host 614 can be implemented as a computing device (e.g., a desktop). In another implementation, the adaptive video test component 102 (e.g., or the component 302 or the component 402) can be controlled by the DUT 602 (e.g., via a user interface on the DUT 602).

Figure 7:
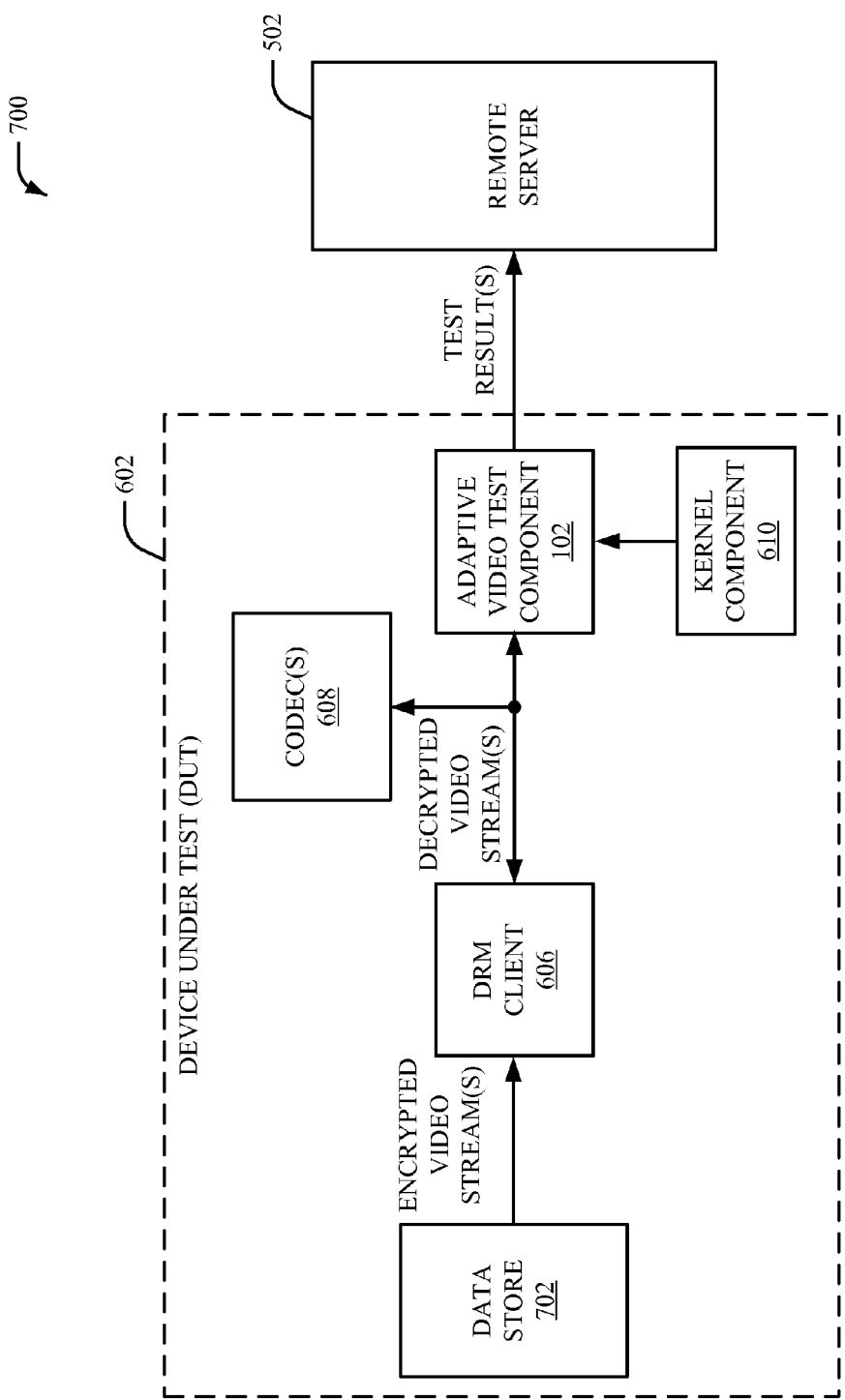
FIG. 7 illustrates a block diagram of DUT in another example adaptive video test system, in accordance with various aspects and implementations described herein.

Referring now to FIG. 7, there is illustrated a non-limiting implementation of a system 700 in accordance with various aspects and implementations of this disclosure. The system 700 includes the DUT 602. The DUT 602 can include the component 102 (e.g., or the component 302 or the component 402), the DRM client 606, the one or more codecs 608, the kernel component 610 and a data store 702.

The data store 702 can store one or more videos (e.g., offline video content). Therefore, the component 102 (e.g., or the component 302 or the component 402) and/or the one or more codecs 608 can receive one or more videos from the data store 702 to test playback of offline video content. The one or more videos stored in the data store 702 can be DRM videos (e.g., DRM encrypted videos). The one or more videos stored in the data store 702 can be copied from an offline source (e.g., an offline device) and/or an online source (e.g., an online server, an online device, etc.).

Referring now to FIG. 8, there is illustrated a non-limiting implementation of a test report 800 in accordance with various aspects and implementations of this disclosure. The test report 800 shown in FIG. 8 includes build information 802, a test summary 804, one or more tests 806, one or more results 808 and one or more details (e.g., test details) 810.

The build information 802 can include information pertaining to the DUT (e.g., the DUT 602). The build information 802 can include a build model, a build identification (ID), a build brand, a device name, a build fingerprint and/or a version. The build fingerprint can include the build brand, product information, the device name, board information, version release information, the build ID, version incremental information, type information and/or tag data. The test summary 804 can include a video test version, the number of tests passed, the number of tests failed and/or the number of tests not executed. As such, the test summary 804 can provide an overview of tests implemented on the DUT (e.g., the DUT 602).

The one or more tests 806 can include one or more tested codecs (e.g., CODEC A-N shown in FIG. 8). The one or more tested codecs can be codecs installed and/or supported by the DUT 602. Each of the one or more tests 806 can include a corresponding result (e.g., a corresponding test result). For example, the one or more results 808 can provide pass/fail data (e.g., show whether a tested codec passed each test or failed one or more tests). Additionally, each of the one or more tests 806 can include a corresponding test summary. For example, the one or more details 810 can include additional details for each tested codec. The one or more details 810 can include a link (e.g., an [OPEN] link shown in FIG. 8) that can include further details for each of the tested codecs. For example, the further details can include playback time for the one or more codecs at one or more network speeds (e.g., one or more bitrates) and/or at one or more resolutions. The further details can also include a type of data format for the one or more video sources tested on the DUT, other details regarding the tested codec, etc.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
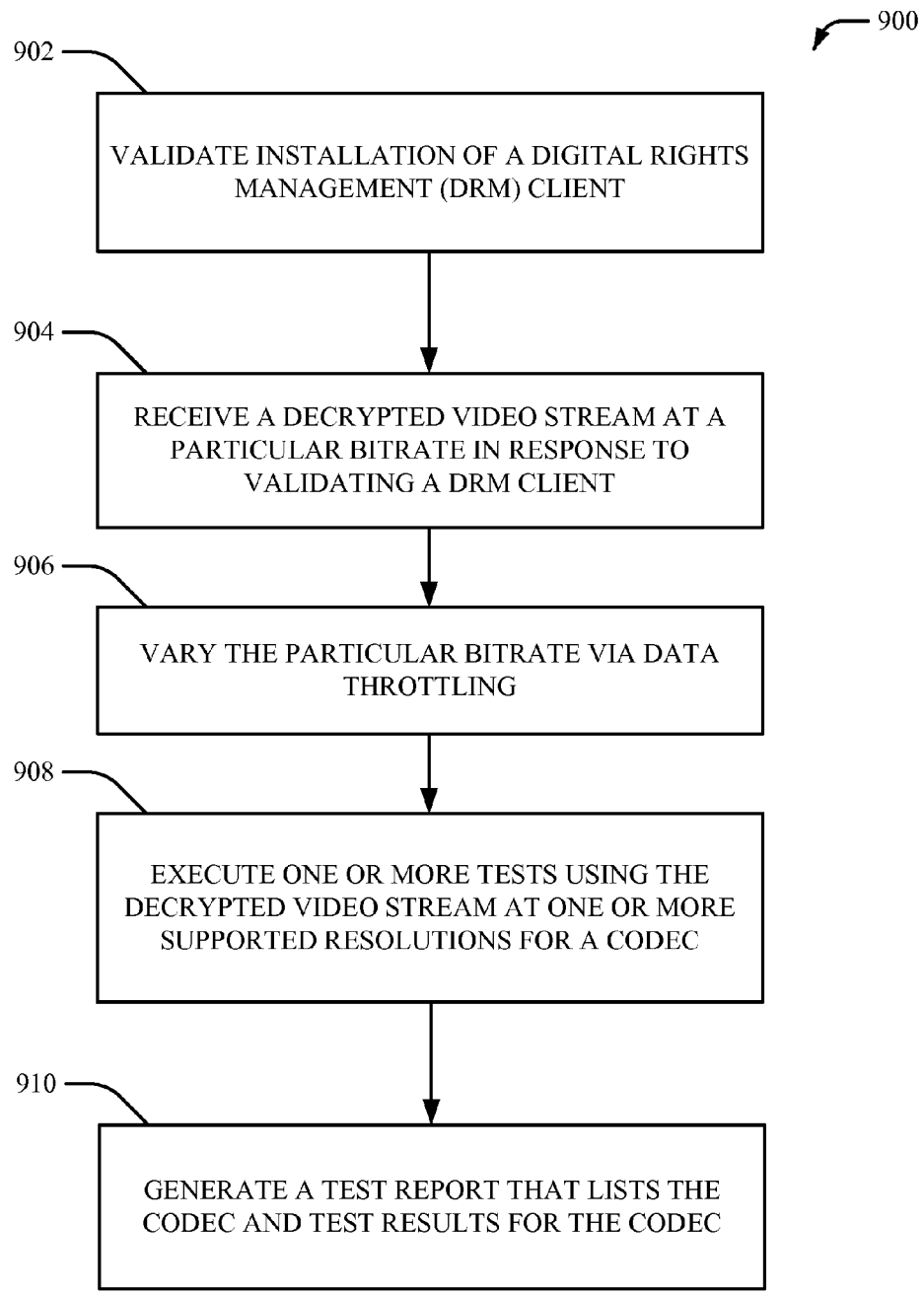
FIG. 9 depicts a flow diagram of an example method for implementing adaptive video stream testing, in accordance with various aspects and implementations described herein.
Figure 10:
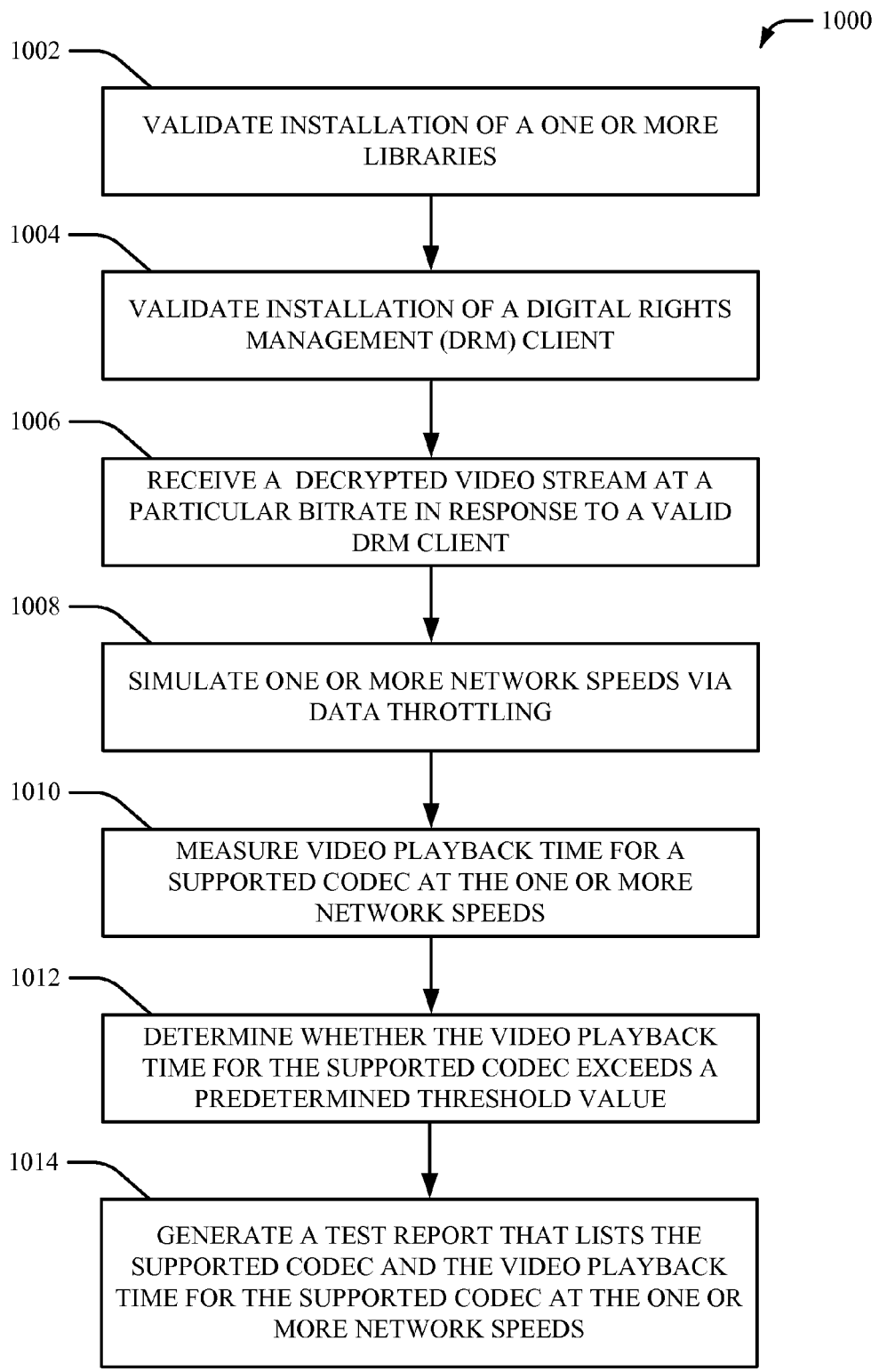
FIG. 10 depicts a flow diagram of another example method for implementing adaptive video stream testing, in accordance with various aspects and implementations described herein.
Figure 11:
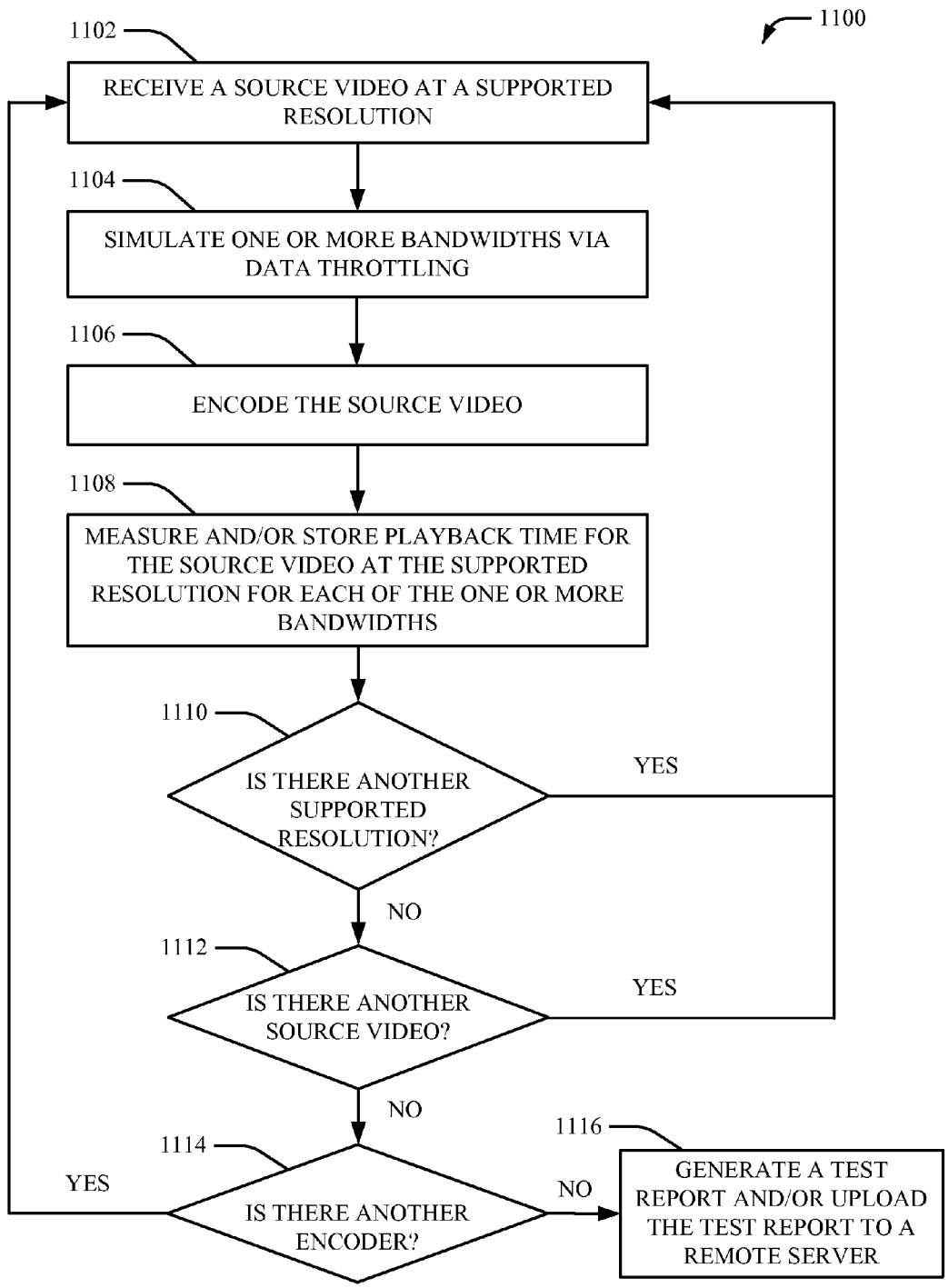
FIG. 11 depicts a flow diagram of an example method for testing one or more supported video streams for a DUT, in accordance with various aspects and implementations described herein.

FIGS. 9-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there illustrated is a methodology 900 for implementing adaptive video stream testing, according to an aspect of the subject innovation. As an example, methodology 900 can be utilized in various applications, such as, but not limited to, mobile phones (e.g., smart phones), tablets, media capturing systems, media displaying systems, computing devices, personal data assistants (PDAs), laptops, personal computers, audio/video devices, etc. Moreover, the methodology 900 can test one or more video sources on a device under test (DUT). Specifically, the methodology 900 can implement one or more tests at each supported resolution for one or more codecs, and can generate a test report based on the one or more tests.

At 902, installation of a digital rights management (DRM) client can be validated (e.g., by a validation component 104). For example, installation of a DRM client plugin on a DUT can be confirmed. At 904, a decrypted video stream at a particular bitrate can be received (e.g., by a media component 106) in response to validating a DRM client. For example, in response to a valid DRM client plugin (e.g., the DRM client 606) installed on the DUT (e.g., the DUT 602), the DUT can receive an encrypted video stream from a video content server. The DRM client 606 can decrypt the encrypted video stream from the video content server. As such, the DRM client 606 can generate the decrypted video stream. At 906, the particular bitrate can be varied (e.g., by a simulation component 108) via data throttling. For example, one or more network speeds for the decrypted video stream can be simulated via data throttling (e.g., one or more threshold values can be modified to simulate the one or more network speeds). At 908, one or more tests can be executed (e.g., by a test component 110) using the decrypted video stream at one or more supported resolutions for a codec. For example, one or more tests for one or more codecs installed on the DUT can be executed. The tests can be executed at each supported resolution for the one or more codecs and/or at the one or more bitrates. At 910, a test report that lists the codec and test results for the codec can be generated (e.g., by a report component 304). For example, a test report that includes a list of one or more supported codecs on the DUT can be generated. Test results correspond to each of the one or more supported codecs on the DUT can also be generated.

Referring to FIG. 10, there illustrated is another example methodology 1000 for implementing adaptive video stream testing. At 1002, installation of one or more libraries can be validated (e.g., by a validation component 104). For example, confirmation of one or more libraries installed on the DUT 602 can be validated. At 1004, installation of a digital rights management (DRM) client can be validated (e.g., by a validation component 104). For example, installation of the DRM client 606 on the DUT 602 can be validated. At 1006, a decrypted video stream at a particular bitrate can be received (e.g., by a media component 106) in response to a valid DRM client. For example, the DUT 602 can receive one or more encrypted video streams from a video content server. The DRM client 606 can decrypt the one or more encrypted video streams from the video content server to generate one or more decrypted video streams. At 1008, one or more network speeds can be simulated (e.g., by a simulation component 108) via data throttling. For example, data throttling can be implemented to simulate one or more different network bandwidths (e.g., different bitrates). At 1010, video playback time for a supported codec at the one or more network speeds can be measured (e.g., by a test component 110). For example, video playback time for one or more supported codecs on the DUT 602 can be measured. The video playback time can be measured for one or more different network bandwidths. At 1012, it can be determined (e.g., by a test component 110) whether the video playback time for the supported codec exceeds a predetermined threshold value. For example, the threshold level can be set to an acceptable response time (e.g., buffering time, loading time, etc.) for video playback. At 1014, a test report can be generated (e.g., by a report component 304) that lists the supported codec and the video playback time for the supported codec at the one or more network speeds. For example, a test report can include a list of one or more supported codecs on the DUT 602. The test report can also include the video playback time for each decrypted video stream (e.g., each simulated video stream) tested on the one or more supported codecs. The playback time for each decrypted video stream can be listed for each of the one or more network speeds.

Referring to FIG. 11, there illustrated is a methodology 1100 for testing one or more supported video streams for a DUT. At 1102, a video stream can be received (e.g., by a media component 106) at a supported resolution. For example, a source video decrypted by the DRM client 606 at a supported resolution (e.g., 360p, 480p, 720p, 1080p, etc.) of an encoder can be received. At 1104, one or more bandwidths can be simulated (e.g., by a simulation component 108) via data throttling. For example, one or more network speeds (e.g., one or more bitrates) for one or more video streams can be simulated by implementing a data throttling mode on the DUT 602. At 1106, the source video can be encoded (e.g., by a codec 608). For example, a codec 608 can encode the video stream at a particular resolution (e.g., 720p) supported by the codec 608. At 1108, playback time for the source video at the supported resolution for each of the one or more bandwidths can be measured and/or stored (e.g., by a test component 110). For example, the test component 110 can measure and/or store playback time for the source video encoded at 720p for a first bitrate and a second bitrate (e.g., different threshold levels).

At 1110, it can be determined (e.g., by a test component 110) if there is another supported resolution. For example, the test component 110 can determine whether there is another supported resolution (e.g., 1080p) for the codec 608. If yes, the methodology 1100 can return to 1102. If no, the methodology can proceed to 1112. At 1112, it can be determined (e.g., by a media component 106) if there is another source video. For example, the media component 106 can determine if there is another video stream (e.g., another test video stream) to test on the DUT 602. If yes, the methodology can return to 1102 (e.g., a new test video source can be tested at 720p). If no, the methodology can proceed to 1114. At 1114, it can be determined (e.g., by a test component 110) if there is another encoder. For example, the test component 110 can determine if there is another codec 608 installed on the DUT 602. If yes, the methodology 1100 can return to 1102 (e.g., the test video source can be tested on a different codec). If no, the methodology 1100 can proceed to 1116. At 1116, a test report can be generated (e.g., by a report component 304) and the test report can be uploaded (e.g., by an output component 404) to a remote server. For example, a test report with results for each tested codec (e.g., playback time for each supported resolution and/or bandwidth) can be uploaded to a backend server.

Figure 12:
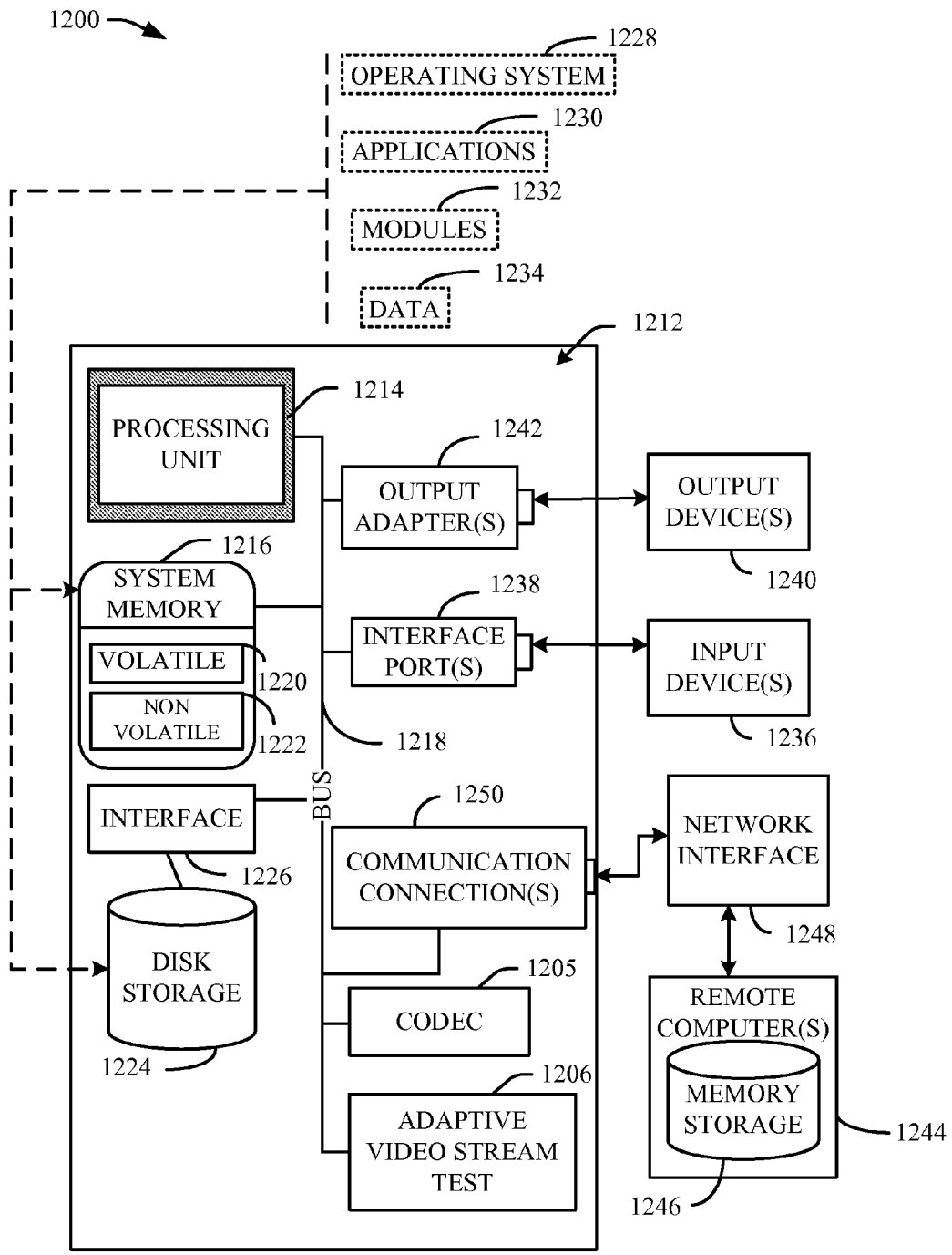
FIG. 12 is a schematic block diagram illustrating a suitable operating environment.
Figure 13:
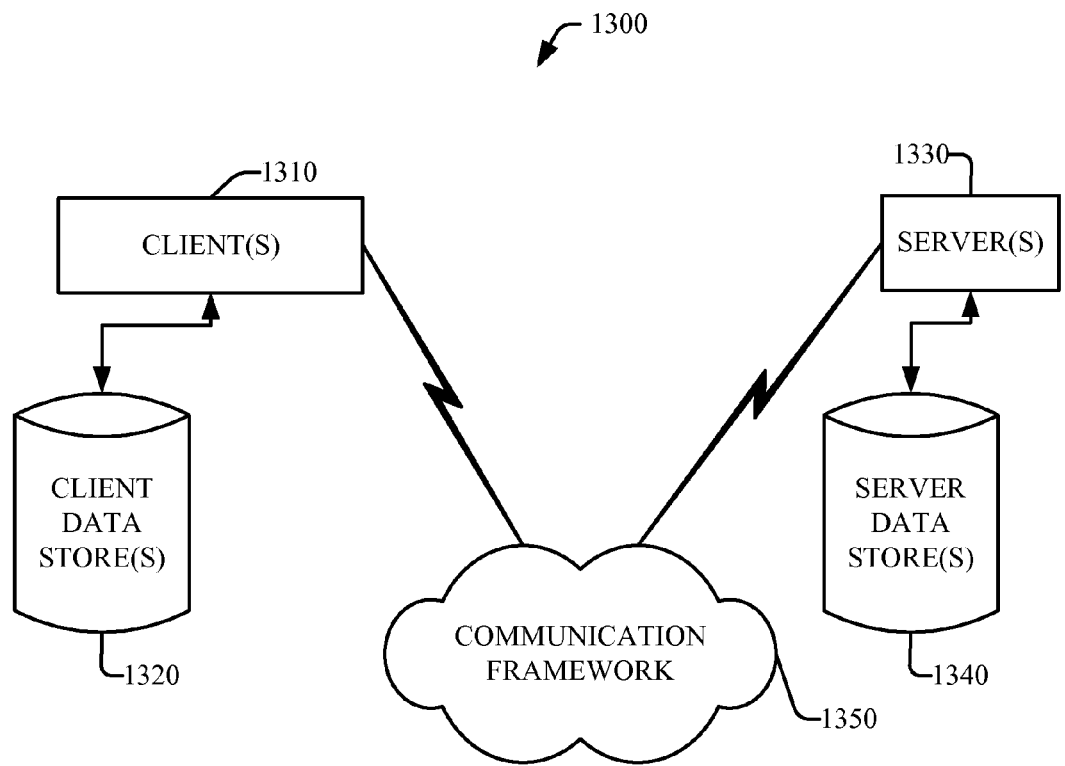
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented.

With reference to FIG. 12, a suitable environment 1200 for implementing various aspects of this disclosure includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. In addition, codec 1205 (e.g., codec 608) may include at least one of an encoder or decoder, wherein the at least one of an encoder or decoder may consist of hardware, a combination of hardware and software, or software. Although, codec 1205 is depicted as a separate component, codec 1205 may be contained within non-volatile memory 1222.

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

It is to be appreciated that the computer 1212 can be used in connection with implementing one or more of the systems or components shown and described in connection with FIGS. 1-7. In accordance with various aspects and implementations, the computer 1212 can be used to implement adaptive video stream testing. In certain exemplary embodiments, the computer 1212 includes an adaptive video test component 1206 (e.g., the component 102, the component 302 or the component 402) that can contain, for example, a validation component 104, a media component 106, a simulation component 108, a test component 110, a report component 304 and/or an output component 404, each of which can respectively function as more fully disclosed herein.

FIG. 13 is a schematic block diagram of a sample-computing environment 1300 with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., validation component, media component, simulation component, test component, report component, output component, threshold component, throttling component, kernel component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a memory storing computer executable components; and
    a processor configured to execute the following computer executable components stored in the memory:
        a simulation component that simulates a network speed for a stream of video content via data throttling; and
        a test component that measures an interval of time for a codec to playback the video content of the stream at the network speed on a particular device, and determines whether the interval of time exceeds a threshold amount of time.

2. The system of claim 1, wherein the simulation component simulates the network speed for the stream in response to a determination that a digital rights management (DRM) client is valid.

3. The system of claim 2, further comprising:
    a media component that receives the stream at a particular bitrate in response to the determination that the DRM client is valid.

4. The system of claim 3, wherein the media component receives the stream at one or more resolutions supported by the codec.

5. The system of claim 1, wherein the simulation component modifies the network speed in response to the interval of time.

6. The system of claim 1, wherein the simulation component modifies a kernel counter to receive an encrypted version of the stream at the network speed.

7. The system of claim 1, wherein the simulation component further simulates plurality of network speeds for the stream of video content via the data throttling, and the test component further measures respective intervals of time for a plurality of codecs to playback the video content of the stream at the plurality of network speeds on the particular device, and determines whether the respective intervals of time exceed the threshold amount of time.

8. The system of claim 7, wherein the test component further measures respective intervals of time for the plurality of codecs to playback the video content of the stream at a plurality of resolutions and at the plurality of network speeds on the particular device, and determines whether the respective intervals of time exceed the threshold amount of time.

9. The system of claim 1, further comprising:
a report component that generates a test report that includes at least the interval of time for the codec to playback the video content of the stream at the network speed.

10. A method, comprising:
receiving, by a device including a processor, a stream of video content at a particular bitrate;
varying, by the device, the particular bitrate for the stream to one or more other bitrates by implementing data throttling;
measuring, by the device, respective durations of time for the codec to playback the video content at the one or more other bitrates on the device; and
determining, by the device, whether the respective durations of time exceed a threshold value.

11. The method of claim 10, further comprising measuring, by the device, respective durations of time for the codec to playback the video content at a plurality of resolutions and at the one or more other bitrates on the device.

12. The method of claim 10, further comprising generating, by the device, a test report that lists the codec and test results associated with the determining whether the respective durations of time exceed the threshold value.

13. The method of claim 12, further comprising uploading, by the device, the test report that lists the codec and the test results associated with the determining whether the respective durations of time exceed the threshold value to a server.

14. The method of claim 10, further comprising modifying, by the device, the one or more other bitrates in response to at least one of the intervals of time.

15. The method of claim 10, further comprising modifying, by the device, a kernel counter to implement the varying the particular bitrate for the stream to the one or more other bitrates.

16. A non-transitory computer readable medium comprising computer-executable instructions, that in response to execution, cause a system including a processor to perform operations, comprising:
simulating a network speed for a stream of video content by implementing data throttling;
determining an interval of time for playing back the video content of the stream at the network speed via a codec on a particular device; and
determining whether the interval of time exceeds a threshold value.

17. The non-transitory computer readable medium of claim 16, wherein the operations further comprise receiving the stream in response to validating a digital rights management client.

18. The non-transitory computer readable medium of claim 16, wherein the operations further comprise generating a test report for codec that includes at least the interval of time.

19. The non-transitory computer readable medium of claim 16, wherein the operations further comprise modifying the network speed in response to the interval of time.

20. The non-transitory computer readable medium of claim 16, wherein the operations further comprise:
simulating a plurality of network speeds for the stream of video content by implementing the data throttling;
determining respective intervals of time for playing back the video content of the stream at the plurality of network speeds via the codec on the particular device; and
determining whether the respective intervals of time exceed the threshold value.

* * * * *